(12) United States Patent
Cashen et al.

(10) Patent No.: US 8,360,105 B2
(45) Date of Patent: Jan. 29, 2013

(54) AIR ADMITTANCE VENT

(75) Inventors: Steven W. Cashen, Osceola, IN (US); Randolph J. Christman, South Bend, IN (US); Patrick D. Delahanty, Elkhart, IN (US); Maynard R. Searing, Sr., LaPorte, IN (US); G. Scott Searing, Kingsbury, IN (US); Fred Krolzick, South Bend, IN (US)

(73) Assignee: JB Products, Inc., South Bend, IN (US)

( * ) Notice: Subject to any disclaimer, the term of this patent is extended or adjusted under 35 U.S.C. 154(b) by 0 days.

(21) Appl. No.: 13/066,545

(22) Filed: Apr. 18, 2011

(65) Prior Publication Data

US 2012/0261006 A1 Oct. 18, 2012

(51) Int. Cl.
*F16K 15/14* (2006.01)
(52) U.S. Cl. ........ 137/854; 137/526; 137/541; 137/857; 251/333
(58) Field of Classification Search ........... 137/516.25–516.29, 526, 541, 137/542, 843, 852, 854, 856, 857; 251/172, 251/331, 333

See application file for complete search history.

(56) References Cited

U.S. PATENT DOCUMENTS

| 3,605,132 | A | | 7/1969 | Lineback |
| 4,962,548 | A | * | 10/1990 | van Deventer et al. ........... 4/211 |
| 7,395,835 | B1 | | 7/2008 | Gohlke |
| 7,438,090 | B2 | * | 10/2008 | Steele ........................ 137/854 |

* cited by examiner

*Primary Examiner* — Kevin Lee
*Assistant Examiner* — Macade Brown
(74) *Attorney, Agent, or Firm* — R. Tracy Crump

(57) ABSTRACT

The air admittance vent ("AAV") includes a cup shaped vent body and a vertically reciprocating valve element that seats against a valve seat that has two separate contact areas defined by an annular ridge and a conical face formed in the bottom of the vent body. When the valve element moves into its closed position, the pliable diaphragm of the valve element initially contacts the annular ridge, which forms a first part of the valve seat before moving fully into sealing contact with the conical face, which forms the second part of the valve seat. The contact with the annular ridge provides a first initial seal before the diaphragm nests into contact with the conical face to form a second seal with the valve seat.

5 Claims, 6 Drawing Sheets

AIR ADMITTANCE VENT

This invention relates to an air admittance vent and in particular an air admittance valve for use in recreational vehicles.

BACKGROUND OF THE INVENTION

Air admittance vents ("AAVs") are used in a variety of plumbing systems to prevent the escape of unwanted gases through drain pipes. AAVs are vertically connected to the drain pipes and supplement the vertical vent pipe in large plumbing systems. AAVs open under the vacuum created in the drain by the flow of water through the drain pipe and close when the water is no longer flowing through the drain.

Spring type AAVs, such as the plumbing vent valve described in U.S. Pat. No. 3,604,132, use a coil spring to hold the valve member closed. For many years, the spring type of AAVs were commonly used in the plumbing systems of recreational vehicles ("RVs"), as well as, in residential and commercial plumbing systems. The coil spring facilitated valving mechanism ensured that the vents remained closed while the RV moved even over rough roads. However, the introduction of a new United States industry standard, namely, NSF/ANSI 24 established by NSF International Standard/American National Standard and ASSE Standaard 1051 established by the American Society of Sanitary Engineering forced the use of spring-less, gravity type AAVs, such a the AAV described in U.S. Pat. No. 7,395,835. These industry standards required that the AAV open at extremely low pressure differentials, namely pressure differentials ranging from 0.009-1.0 psi. Even though ideal for use in RVs because the valve member was held closed by the coil spring even under rough travel conditions, conventional spring type AAVs could not be made to operated under the new standards. The coil springs that hold the valve closed and the flat valve seat generally prevent spring type AAVs from consistently opening at the very low pressure differentials imposed by the new standard. Various attempts were made to construct a springed AAV that would comply with the new standard, including the use of very light springs and valve elements, but were unsuccessful at balancing the holding force of the spring needed to keep the vent closed during rough travel conditions while still meeting the pressure differential standards.

SUMMARY OF THE INVENTION

The present invention seeks to provide an improved spring type air admittance vent that opens at very low vacuum pressures at very low pressure differentials. The AAV of this invention includes a cup shaped vent body and a vertically reciprocating valve element that seats against a valve seat that has two separate contact areas defined by an annular ridge and a conical face formed in the bottom of the vent body. When the valve element moves into its closed position, the pliable diaphragm of the valve element initially contacts the annular ridge, which forms a first part of the valve seat before moving fully into sealing contact with the conical face, which forms the second part of the valve seat. The contact with the annular ridge provides a first initial seal before the diaphragm nests into contact with the conical face to form a second seal with the valve seat. The sloped geometry of the conical face allows the valve element to self center and nest itself into a final sealed engagement, which greatly reduces the required spring force needed to maintain the proper seal. Providing a valve seat having two separate and distinct contact areas also helps to reduce the required spring force to maintain the proper seal. Consequently, the AAV of this invention can operate consistently under very low pressure differentials.

These and other advantages of the present invention will become apparent from the following description of an embodiment of the invention with reference to the accompanying drawings.

BRIEF DESCRIPTION OF THE DRAWINGS

The drawings illustrate an embodiment of the present invention, in which.

DESCRIPTION OF THE PREFERRED EMBODIMENT

Figure 1:
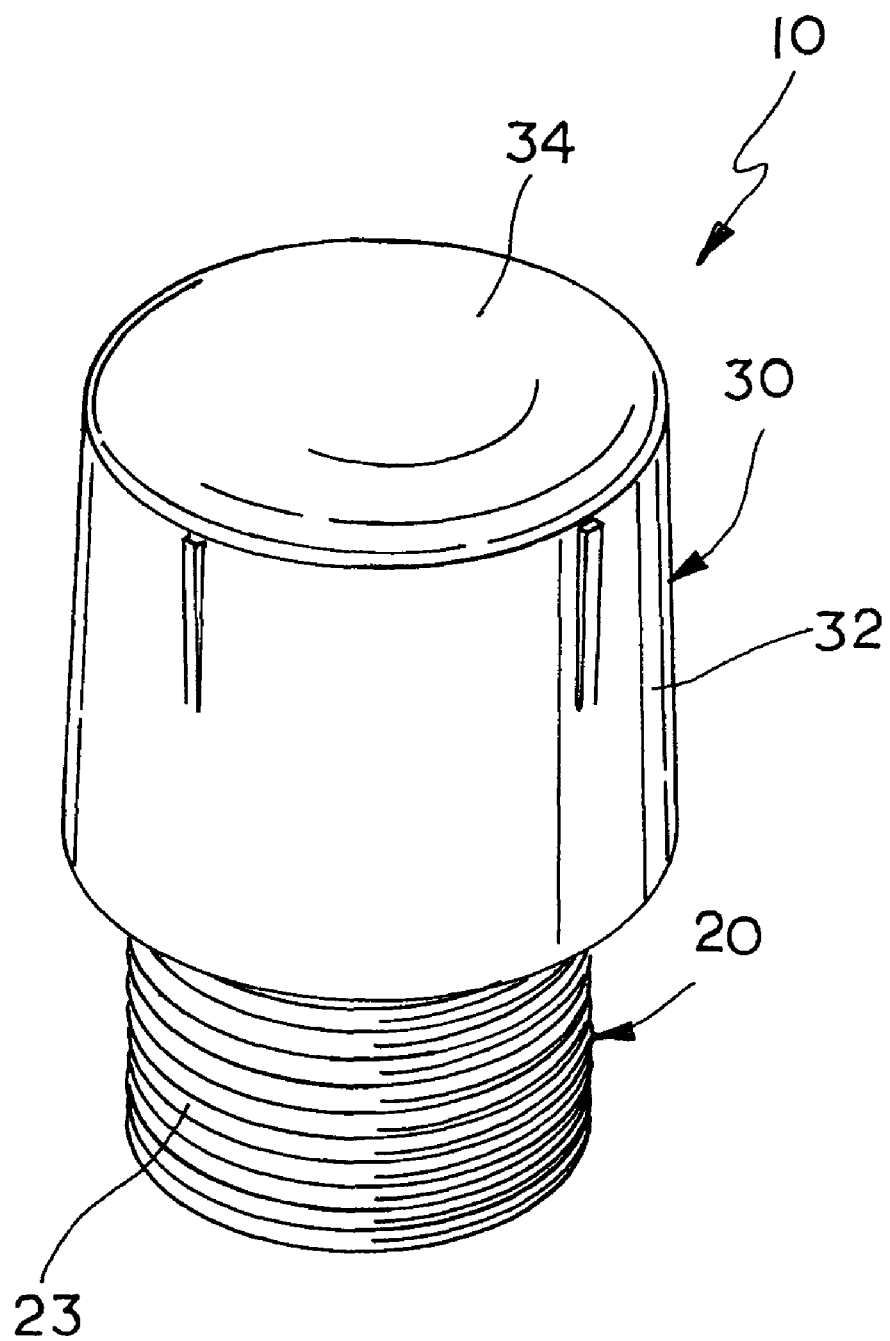
FIG. 1 is a perspective view of an embodiment of the air admittance vent (AAV) of the invention.
Figure 2:
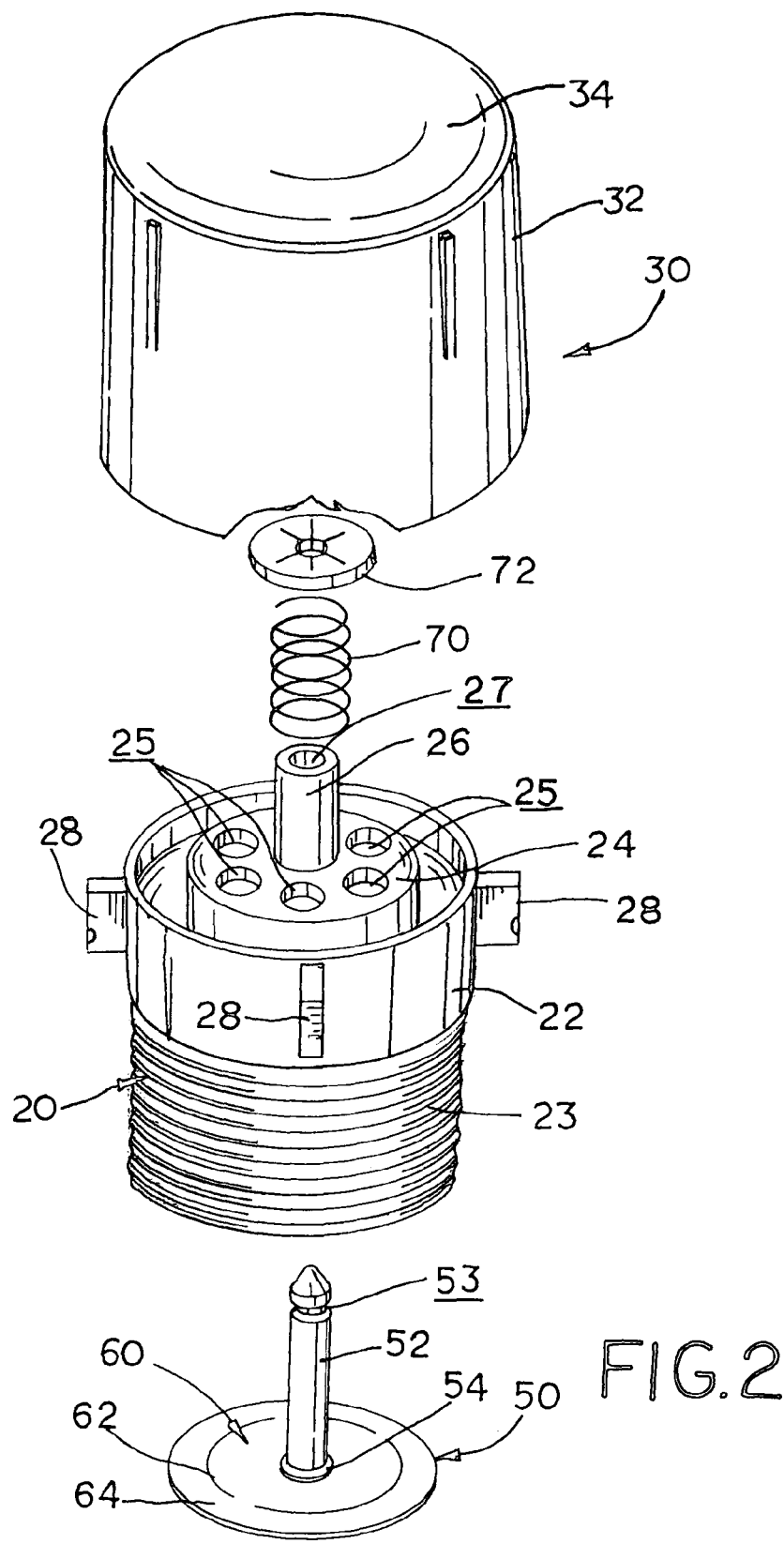
FIG. 2 is an exploded view of the AAV of FIG. 1.

Referring now to the drawings, FIGS. 1-7 show an embodiment of the air admittance vent ("AAV") of this invention, which is designated generally as reference numeral 10. AAV 10 includes a vent body 20, a valve element 50 and a cap 30. AAV 10 is generally configured to be mounted to the end of a vertical drain pipe. As illustrated in this embodiment of the invention, the lower portion of vent body sidewall 22 has threads 23 for mounting AAV 10 to the threaded female end of a vertical drain pipe. Vent body 20 may also be adapted and configured to be connected to a drain pipe using other conventional plumbing means known in the art within the scope of this invention.

Both vent body 20 and cap 30 are ideally constructed form a plastic material, such as nylon and are preferably formed or molded as single piece structures. Vent body 20 is generally cup-shaped and includes a cylindrical sidewall 22 and an integral upper end wall 24, which encloses the top end of the vent body and supports a valve element 30. Similarly, cap 30 is also generally cup-shaped and includes a cylindrical sidewall 32 and a top 34. Generally, cap 30 is sonically welded to or otherwise permanently affixed to vent body 20 using suitable adhesives. Cap 30 supported atop vent body 20 on four mounting tabs 28 that extend radially from vent body sidewall 22. Mounting tabs 28 seat within corresponding radially spaced slots 37, which are formed on the inside of cap sidewall 32. Mounting tabs 28 also space cap sidewall 32 radially from vent body sidewall 22 to form an air passage, through which airflow enters and exits AAV 10.

Figure 3:
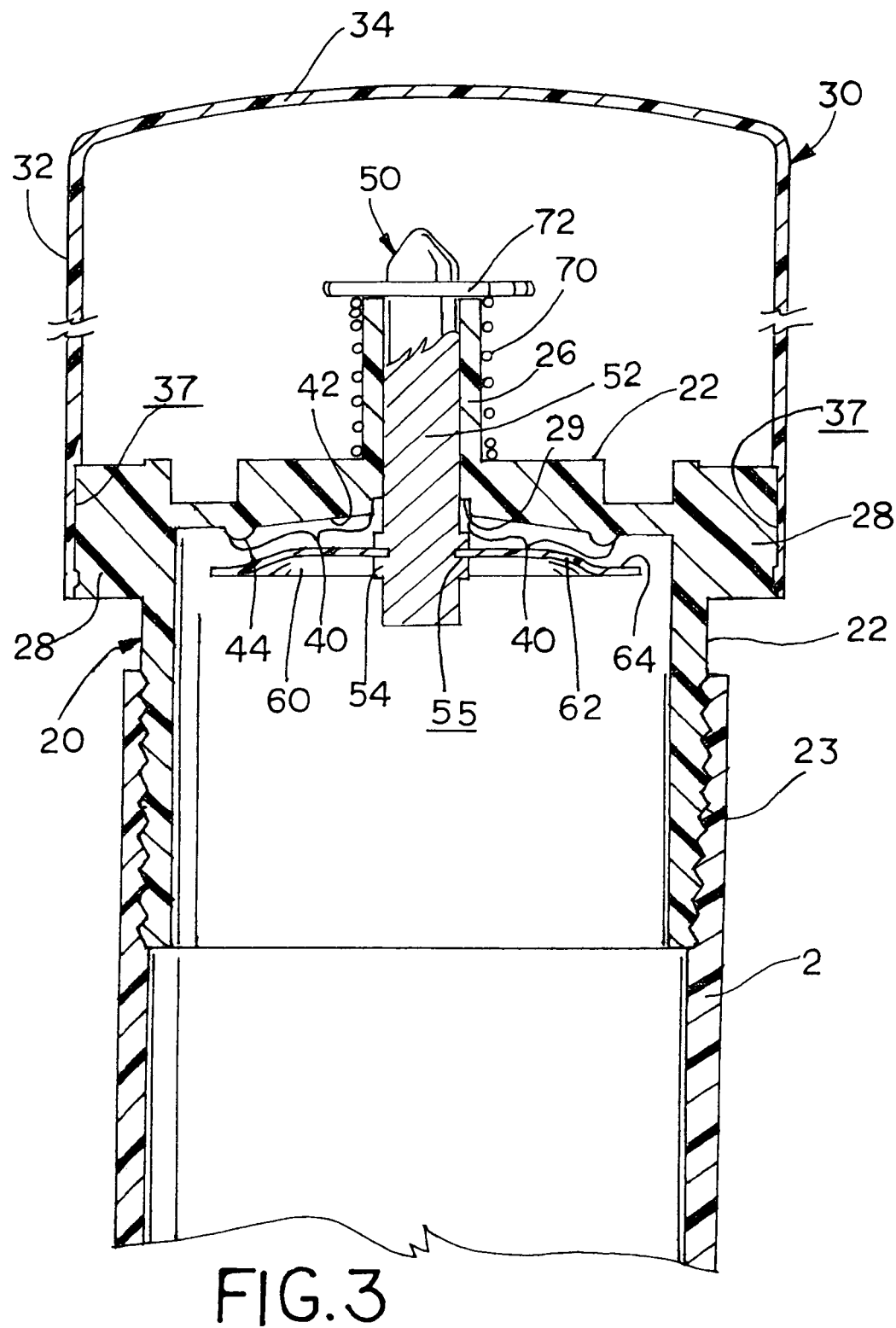
FIG. 3 is a sectional view of the AAV of FIG. 1 shown in the open position.
Figure 4:
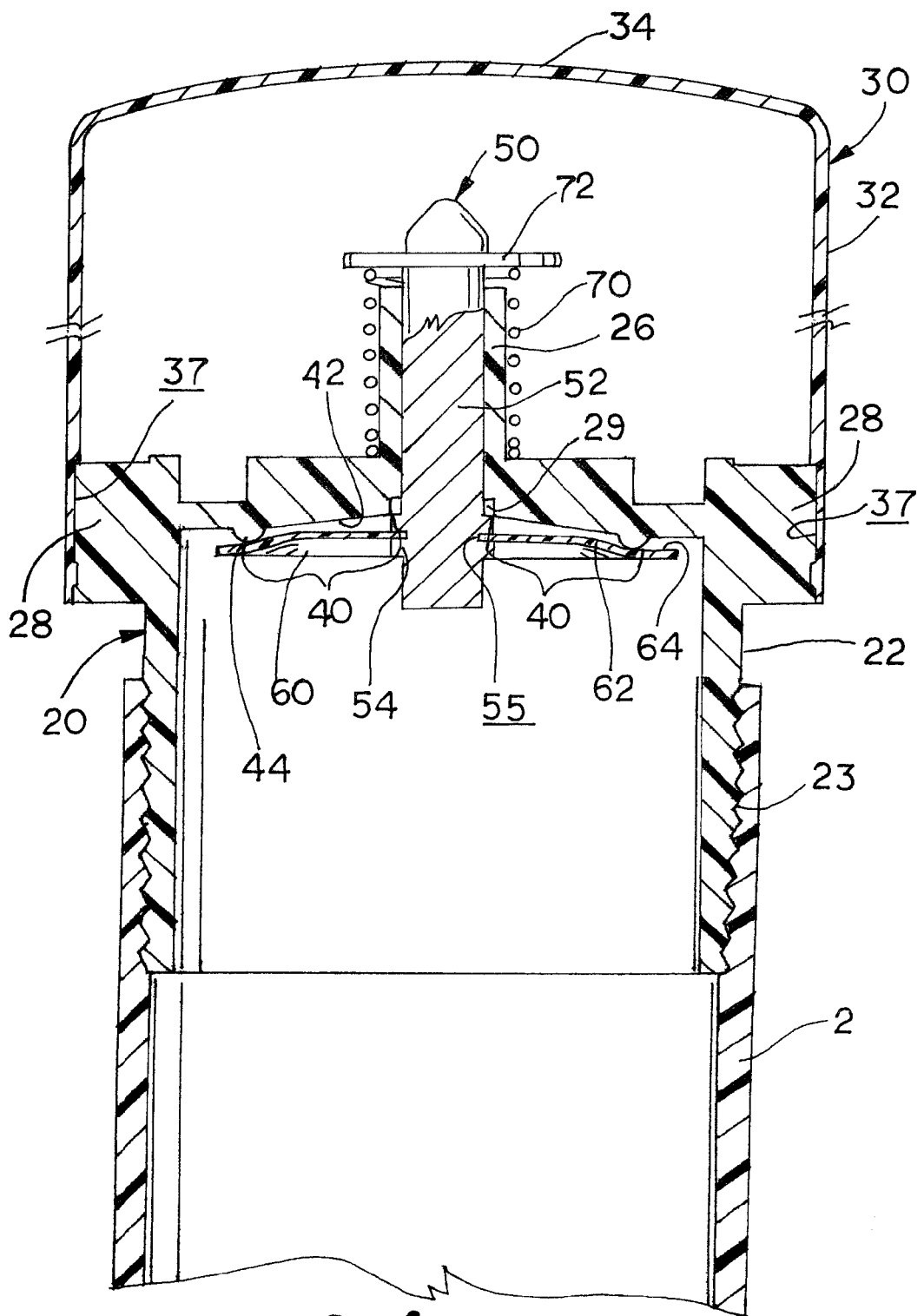
FIG. 4 is a sectional view of the AAV of FIG. 1 shown in an partially closed position.
Figure 5:
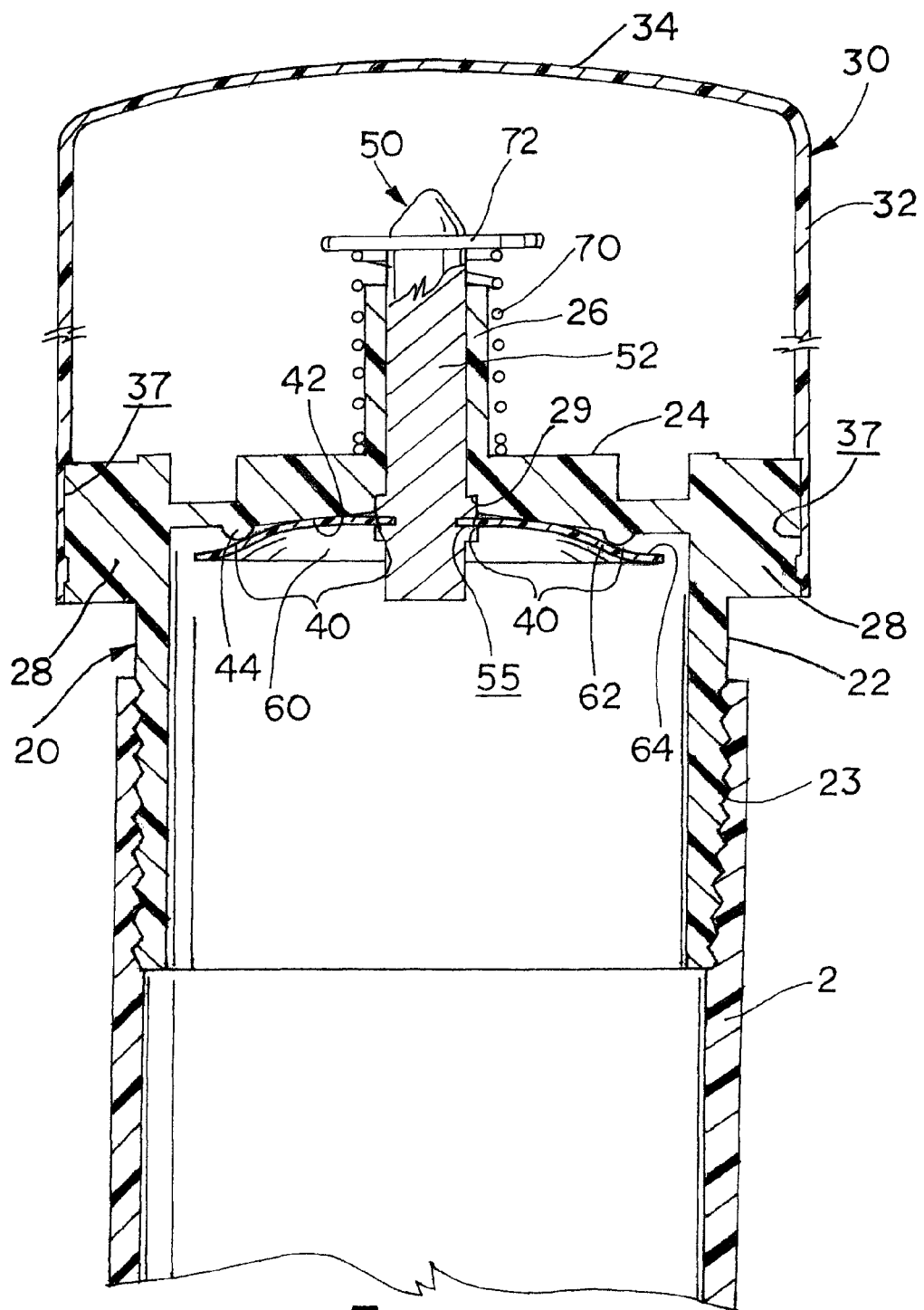
FIG. 5 is a sectional view of the AAV of FIG. 1 shown in the closed position.
Figure 6:
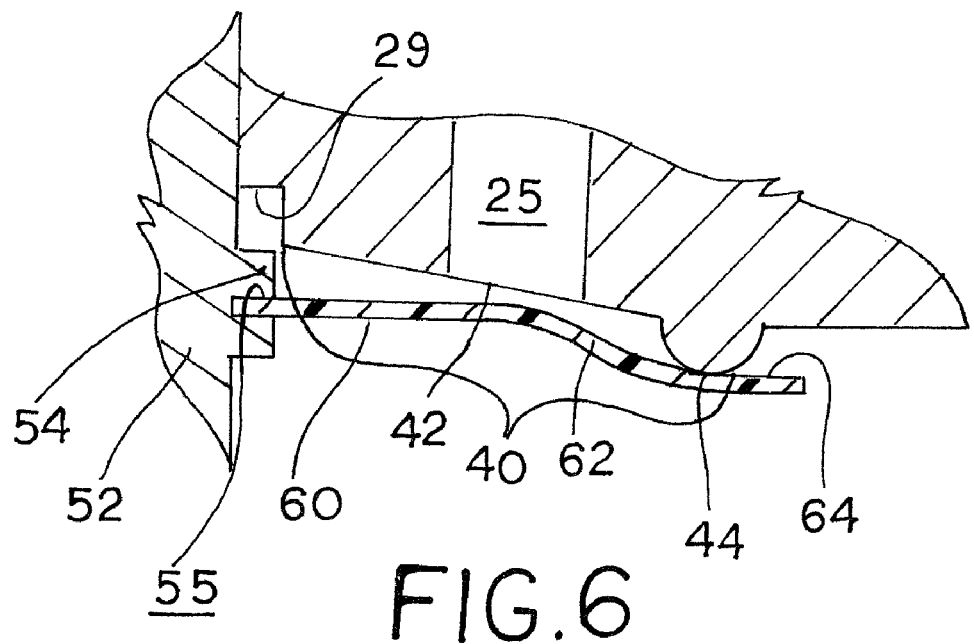
FIG. 6 is a magnified sectional view showing the diaphragm contacting the ridge of the valve seat when the valve member is in the partially closed position.
Figure 7:
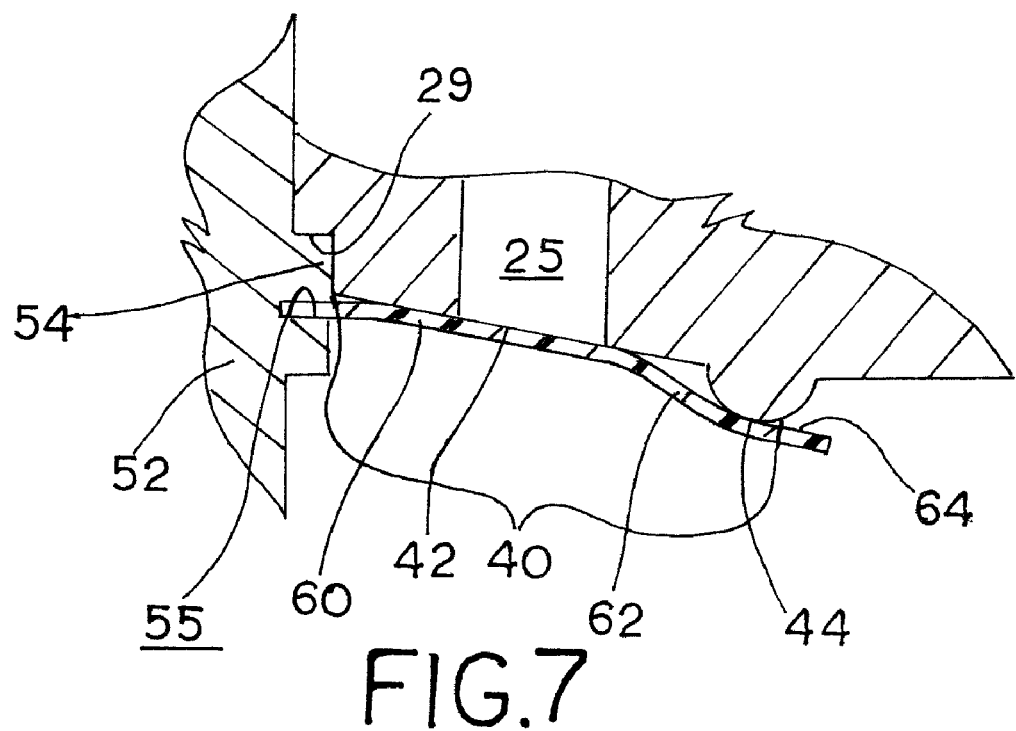
FIG. 7 is a magnified sectional view showing the diaphragm contacting the ridge and conical face of the valve seat when the valve member is in the fully closed position.

A valve element 50 is reciprocally seated within a tubular column 26 that extends upward from vent body end wall 24. Valve element 50 includes a reciprocating post 52 and a pliable diaphragm 60. Post 52 is constructed of a light-weight plastic material, such as nylon. Post 52 extends through an axial bore 27 in column 24. Post 52 is retained within column 26 by a snap-fit washer 72, which is seated within an annular grove 53 in post 52. A helical valve spring 70 is seated over column 26 between retainer washer 72 and vent body end wall 24. As best shown in FIGS. 3-5, the lower end of post 32 has an integral annular collar 54. Collar 54 abuts an internal shoulder 29 formed within the axial bore 27 to limit the upward travel of post 52 within column 26. Vent body end wall 24 also has six vent openings 25 radially spaced around column 26, which allow airflow through the end wall.

As best shown in FIGS. 3-5, the bottom of vent body end wall 24 has a conical face 42 around axial bore 27 and an annular ridge 44. Conical face 42 slopes radially downward from axial bore 27 at approximately three degree (3°) angle and terminates at ridge 44. Ridge 44 protrudes downward from the bottom of vent body end wall 24 and has a rounded distal edge. Conical face 42 and ridge 44 form a valve seat 40 for valve element 50.

Diaphragm 60 is constructed of a rubber or synthetic rubber compound and is integrally molded to the end of post 52. As shown, diaphragm 60 is typically over-molded into an annular groove 55 in collar 54 to provide a strong mechanical connection between the post and diaphragm. Diaphragm 60 has a slightly domed profile formed by an intermediate joggle 62 in the body of the diaphragm. Diaphragm 60 terminates in a flat peripheral edge 64 and has a slightly domed profile formed by an intermediate joggle in the diaphragm body. It should be noted that the thickness of diaphragm 60 is very thin so that the diaphragm is very light-weight and pliable. In addition, the material composition of the rubber or synthetic rubber of diaphragm 60 is selected so that the diaphragm is not only very light-weight, but also very elastic and viscid.

Valve element 50 reciprocates between an open position (FIG. 3) and a normally closed position (FIG. 5). Valve element 50 opens and closes in response to vacuum pressure within drain pipe 2. In the open position, valve element 50 is pulled downward by vacuum pressure in drain pipe 2 so that diaphragm 60 is spaced from the bottom of vent body end wall 24 to allow airflow through vent openings 25. In the closed position, valve element 50 is urged upward by spring 70 so that diaphragm 60 abuts against two separate contact areas of valve seat 40, namely, ridge 44 and conical face 42, to prevent airflow through vent openings 25. It should be noted that when moving from the open position to the closed position, diaphragm 50 initially contacts ridge 44 before moving fully into sealing contact with conical face 42 (FIG. 4). Ridge 44 provides the initial contact area for valve seat 40. As valve member 50 moves upward into the closed position, the peripheral edge 64 initially contacts the lowest point of the rounded edge of ridge 44. As valve element 50 continues upward, diaphragm 60 is stretched slightly around before the rest of the diaphragm raises into contact with conical face 42. The elastic and viscid properties of the material composition allow diaphragm 60 to lightly adhere to ridge 44 to provide a first initial seal before diaphragm 40 moves fully into contact with conical face 44. Conical face 44 provides a second contact area for valve seat 40. The sloped geometry of conical face 44 allows diaphragm 60 to nest into a final sealed engagement with valve seat 40.

One skilled in the art will note certain advantages provided by the configuration and geometry of the valve seat of this invention that allow the AAV of this invention to operate under extremely low pressure differentials. The sloped geometry of the conical face allows the valve element to self center and nest itself into a final sealed engagement, which greatly reduces the required spring force needed to maintain the proper seal. Providing a valve seat having two separate and distinct contact areas also helps to reduce the required spring force to maintain the proper seal. Reducing the required spring force allows the use of very light-weight springs. The slight stretch caused by the initial contact of the diaphragm around the annular ridge, which forms part of the valve seat, also provides a small opening force that further counter weights the spring force and helps the valve element open under very low vacuum pressures. These features combine to enable the AAV of this invention to operate consistently under the influence of extremely low pressure differentials (lower than 0.009 psi), thereby meeting certain industry standards that conventional spring type AAVs cannot.

Because it can operate under extremely low pressure differentials meeting certain industry standards, the AAVs of this invention are particularly well suited for use in recreational vehicles ("RVs") and other mobile applications. Unlike the gravity-type AAVs commonly used in RV application, which inadvertently open as the RV is bumped and jarred during transportation over a rough road or surface, the use of a spring to actively hold the valve element closed ensures that no unwanted gas escape the system. While the configuration and geometry of the valve seat allows for a greatly reduced spring force, it is still sufficient to hold the valve element closed even under rough road conditions found in recreational vehicle applications.

The embodiment of the present invention herein described and illustrated is not intended to be exhaustive or to limit the invention to the precise form disclosed. It is presented to explain the invention so that others skilled in the art might utilize its teachings. The embodiment of the present invention may be modified within the scope of the following claims.

We claim:

1. An air admittance vent ("AAV") comprising:
   a vent body having a cylindrical side wall adapted for fitting to a vent pipe and an integral end wall, the vent body end wall having a central bore therein and a plurality of vent openings radially spaced around the central bore, the bottom of the vent body end wall has a conical surface diverging downward from the central bore and an annular ridge protruding downward around the conical surface, the conical surface and the annular ridge define a valve seat;
   a valve element supported by the vent body for movement in response to vacuum pressure within a plumbing system between an open position to allow airflow through the vent openings and a closed position for preventing airflow through the vent openings, the valve member includes a post reciprocally seated within the central bore and a pliable diaphragm mounted to the post, the diaphragm is spaced from the valve seat when the valve member is in the open position and abuts the valve seat such that the diaphragm first contacts the annular ridge before the diaphragm contacts the conical surface when the valve element is moved from the open position to the closed position; and
   a spring operatively connected between the vent body end wall and the valve element responsive to low vacuum conditions in the vent pipe to permit the valve element to move from the closed position to the open position in response thereto,
   the diaphragm has a flat peripheral edge that stretches around the annular ridge in sealed engagement when the valve element is in the closed position.

2. The AAV of claim 1 wherein the diaphragm is configured to nest against the conical face when the valve element is in the closed position thereby covering the plurality of vent openings.

3. The AAV of claim 1 wherein the vent body end wall includes a tubular column extending upward therefrom axially around the central bore, the post is reciprocally seated within the column.

4. The AAV of claim 1 wherein the spring is axially seated over the tubular column extending from the vent body end wall.

5. An air admittance vent ("AAV") comprising:
   a vent body having a cylindrical side wall adapted for fitting to a vent pipe and an integral end wall, the vent body end wall includes a central tubular column extending upward therefrom having an axial bore therethrough, the vent body end wall also having a plurality of vent openings extending therethrough and radially spaced around the central column, the bottom of the vent body end wall has a conical surface diverging downward from the axial bore and an annular ridge protruding downward around the conical surface, the conical surface and the annular ridge define a valve seat;
   a valve element supported by the vent body for movement in response to vacuum pressure within a plumbing system between an open position to allow airflow through the vent openings and a closed position for preventing airflow through the vent openings, the valve member includes a post reciprocally seated within the axial bore of the central column and a pliable diaphragm mounted to the post, the diaphragm spaced from the valve seat when the valve member is in the open position and abuts the valve seat such that the diaphragm first contacts the annular ridge before the diaphragm contacts the conical surface when the valve element is moved from the open position to the closed position, the diaphragm has a flat peripheral edge that stretches around the annular ridge in sealed engagement when the valve element is in the closed position and is configured to nest against the conical face when the valve element is in the closed position thereby covering the plurality of vent openings; and
   a coil spring axially seated over the central column and operatively connected between the vent body end wall and the valve element responsive to low vacuum conditions in the vent pipe to permit the valve element to move from the closed position to the open position in response thereto.

* * * * *